(12) United States Patent
Koike

(10) Patent No.: US 6,881,368 B2
(45) Date of Patent: Apr. 19, 2005

(54) RECYCLED ABS RESIN, RECYCLED ABS ALLOY RESIN AND PRODUCTION PROCESS OF ABS ALLOY RESIN

(75) Inventor: Yasushi Koike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 10/055,973

(22) Filed: Jan. 28, 2002

(65) Prior Publication Data

US 2002/0135096 A1 Sep. 26, 2002

(30) Foreign Application Priority Data

Jan. 29, 2001 (JP) ........................................ 2001-020219

(51) Int. Cl.$^7$ .............................................. B29C 47/00
(52) U.S. Cl. ...................... 264/141; 264/911; 264/920; 264/233
(58) Field of Search ................................ 264/141, 920, 264/911, 233, 234; 241/19, 20, 24, 14; 521/41

(56) References Cited

U.S. PATENT DOCUMENTS

| | | | |
|---|---|---|---|
| 4,406,411 A | * 9/1983 | Gall et al. ................... | 428/577 |
| 5,420,181 A | 5/1995 | Eichenauer et al. .......... | 524/91 |
| 5,653,867 A | * 8/1997 | Jody et al. ................... | 209/164 |
| 6,007,005 A | 12/1999 | Gonzales et al. ............. | 241/20 |
| 6,280,667 B1 | * 8/2001 | Koenig et al. ................ | 264/68 |
| 2002/0197498 A1 | * 12/2002 | Koike ......................... | 428/516 |
| 2003/0067089 A1 | * 4/2003 | Wang et al. ................. | 264/102 |

FOREIGN PATENT DOCUMENTS

| | | |
|---|---|---|
| EP | 1 036 651 A1 | 9/2000 |
| EP | 1 055 500 A2 | 11/2000 |
| JP | 58-7444 | 1/1983 |
| JP | 8-67857 | 3/1996 |

* cited by examiner

Primary Examiner—Mark Eashoo
(74) Attorney, Agent, or Firm—Fitzpatrick, Cella, Harper & Scinto

(57) ABSTRACT

The invention relates to a recycled ABS resin.

The recycled ABS resin is obtained by recycling an ABS resin formed into parts by injection molding of a virgin material thereof and used mainly in electric and electronic equipments.

9 Claims, 5 Drawing Sheets

RECYCLED ABS RESIN, RECYCLED ABS ALLOY RESIN AND PRODUCTION PROCESS OF ABS ALLOY RESIN

BACKGROUND OF THE INVENTION

1. Field of the Invention

The present invention relates to a recycled ABS resin, a recycled ABS alloy resin and a production process of an ABS alloy resin.

2. Related Background Art

In recent years, there has been a strong movement on foot to recycle and reuse petrochemical products in addition to metallic materials heretofore recycled with the rise in the sense of environmental protection. In Japan, laws such as "the Law on Waste Disposal and Scavenging" (Law No. 137 in the 45th year of Showa; alias "the Waste Disposal Law"), "the Law on Facilitation of Use of Recycled Resource" (Law No. 48 in the 3rd year of Heisei; alias "the Recycle Law"), "the Law on Facilitation of Collection of Classified Refuse and Recommercialization, etc. Related to Container Packaging" (Law No. 112 in the 7th year of Heisei; alias "the Container Packaging Recycle Law"), and "the Law on Recommercialization of Specified Household Appliances" (Law No. 97 in the 10th year of Heisei; alias "the Household Appliance Recycle Law") are enforced. With the establishment of these laws and regulations, recycling of thermoplastics is being accelerated among some product groups such as large-sized household appliances and automobiles.

However, many of these recyclings have been mainly thermal recycling using a heat source or recycling for cascade use in which deterioration of physical properties of the recycled thermoplastics does not have to be taken into consideration. In a field of electric and electronic equipments, thus, there are, for example, some cases where attention is not very paid to the classification of thermoplastics used in the production of parts, and it seems that the recycling process of thermoplastics formed into parts is not sufficiently established.

In the field of electric and electronic equipments in particular, it is scarcely conducted to produce parts using recycled thermoplastics for reasons of low reliability of recycled products, and so, and it seems that the use of the recycled products is limited to packaging containers, packaging materials and the like if used.

More specifically, although many investigations have been reported as to the recycling process of thermoplastics, properties required of thermoplastics used in parts for electric and electronic equipments are particularly severe compared with packaging materials and the like. Under the circumstances, it is thus necessary to more improve the recycling process in order to recycle parts produced by injection-molding using a virgin material to use the recycled product equally to the virgin material.

SUMMARY OF THE INVENTION

It is an object of the present invention to provide a high-quality recycled ABS resin which can be used in the production of a high-quality ABS alloy resin.

Another object of the present invention is to provide a high-quality recycled ABS alloy resin.

A further object of the present invention is to provide a production process of a high-quality ABS alloy resin.

The above objects can be achieved by the present invention described below.

According to the present invention, there is thus provided a recycled ABS resin obtained by recycling an ABS resin formed into parts by injection molding of a virgin material thereof and used mainly in electric and electronic equipments.

According to the present invention, there is also provided a recycled ABS alloy resin comprising the recycled ABS resin described above and at least one resin selected from the group consisting of PC, PVC and PBT.

According to the present invention, there is further provided a process for producing a recycled ABS alloy resin, which comprises the steps of:

(i) blending the recycled ABS resin described above with at least one resin selected from the group consisting of PC, PVC and PBT;

(ii) melt-mixing the blend obtained in the step (i); and (iii) pelletizing the melt mixture obtained by the step (ii).

According to the present invention, there is still further provided a process for producing a recycled ABS alloy resin, which comprises the steps of:

(i) blending a recycled ABS resin with at least one resin selected from the group consisting of PC, PVC and PBT;

(ii) melt-mixing the blend obtained in the step (i); and (iii) pelletizing the melt mixture obtained by the step (ii), wherein the recycled ABS resin used in the step (i) is obtained through the steps of:

(1) grinding ABS resin molded products and screening the ground resin by a screen having a mesh of 4 to 10 mm to obtain a ground product;

(2) washing the ground product obtained in the step (1) with water in a proportion of at least 10 parts by mass per 1 part by mass of the ground product; and (3) drying the water-washed ground product obtained in the step (2) to a water content of at most 0.3% by mass.

The ABS resin (Acrylonitrile Butadiene Styrene resin) is obtained by adding acrylonitrile to a PS resin (polystyrene resin) for the purpose of more improving chemical resistance and heat resistance without losing the electric insulating properties, heat stability when melting and flowability which are characteristic properties of the PS resin and adding butadiene for the purpose of improving impact resistance and is suitably used in parts produced by injection molding, such as covers and housings for electric and electronic equipments. In the present invention, thus, the principal object in view is to recycle ABS resins capable of being injection-molded.

According to the present invention, when recycling parts produced by injection molding of a virgin material and composed mainly of an ABS resin, process conditions of respective steps are optimized in view of the properties of the ABS resin to conduct the recycling with good operability without passing through any special steps. The resultant recycled ABS resin can be subjected to injection molding like the virgin material to successfully produce parts for electric and electronic equipments.

The recycled ABS resin according to the present invention can be converted into a recycled ABS alloy resin by blending it with a resin such as a PC resin (polycarbonate resin), PVC resin (polyvinyl chloride resin) and/or PBT resin (polybutylene terephthalate resin).

The resultant recycled ABS alloy resin can be improved in defects such as low thermoplasticity, impact resistance and hydrolyzability while retaining good properties inherent in the PC resin, PVC resin and/or PBT resin, such as mechanical properties such as impact strength and tensile strength, transparency, electric properties, and processing properties such as dimensional stability and good molduability, and so the application fields of the recycled ABS resin can be further developed.

DETAILED DESCRIPTION OF THE PREFERRED EMBODIMENTS

Figure 1:
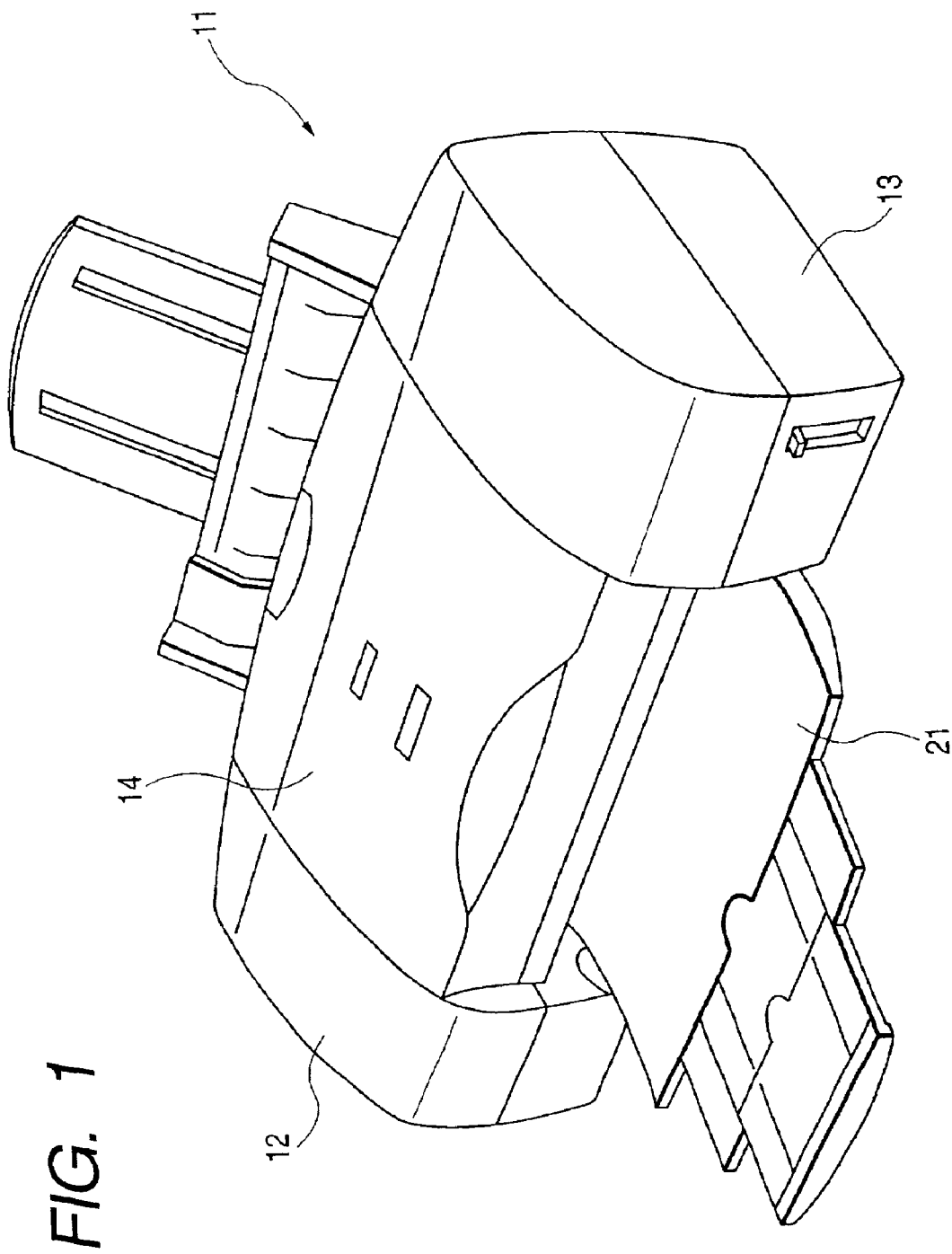
FIG. 1 is a typical perspective view illustrating an exemplary electric and electronic equipment in the present invention.

The present invention will hereinafter be described in detail.

No particular limitation is imposed on the production process of an ABS resin used as a virgin material in the present invention, and it can be produced by an emulsion polymerization process in which monomers of styrene and acrylonitrile in an emulsified state are mixed with rubber in an emulsified state to polymerize the blend; a bulk suspension polymerization process in which rubber is dissolved in monomers of styrene and acrylonitrile to polymerize the solution, and the polymerization solution is suspended in water in the course of the polymerization to continue the polymerization under conditions of suspension polymerization; or the like. When forming alloys of the ABS resin with a resin such as a PC resin, PVC resin and/or PBT resin, a polymerization process is selected according to the properties of the ABS resin used. However, any ABS resin produced by either the emulsion polymerization process or the bulk suspension polymerization process may be alloyed.

In the present invention, the Izod impact strength (also referred to as an Izod impact value) of the recycled ABS resin is preferably at least 0.8 times as much as the Izod impact strength of the virgin material thereof. The testing method of the Izod impact strength is prescribed in JIS K 7110, ASTM D 256 and ISO 180. The melt flow rate (also referred to as MFR) of the recycled ABS resin is preferably at most 1.2 times as much as the melt flow rate of the virgin material thereof.

The Izod impact value among the physical property values of a thermoplastic resin is a value indicating the impact strength of the material thereof and evaluates properties such as impact resistance, brittleness and toughness. The Izod impact value is an index of deterioration of a material. When the material is deteriorated to undergo embrittlement, the Izod impact value thereof becomes small. Accordingly, it can be considered that when the Izod impact value of the recycled ABS resin is almost equal to that of the virgin material thereof, the deterioration of the resin when recycling is inhibited.

The MFR is a measure indicating the flowability of the thermoplastic when melting. There is a tendency that the flowability becomes better and the molecular weight of the resin becomes lower as the numerical value thereof becomes greater. When a material is deteriorated, the molecular weight thereof tends to decrease, and so MFR becomes great. Accordingly, it can be considered that when the MFR of the recycled ABS resin is almost equal to that of the virgin material thereof, the deterioration of the resin when the recycling is inhibited.

The Izod impact value and MFR also vary with virgin materials, and variations thereof are both said to be about ±30%. However, these variations are related to a grade of a certain material, and there is a plurality of colors in a grade. A coloring material used in coloring is composed of a pigment, a dye, a dispersing agent, a stabilizer, etc. The blending ratio among these components varies according to the color in a grade. Accordingly, the variations of the Izod impact value and MFR become small when the color in a grade is limited to a color of a certain hue, and they may be considered as approximately ±25%.

On the other hand, a recycled plastic material has a high possibility that physical property values thereof may vary with every lot according to conditions of collected products which become raw materials. Taking one lot into consideration, variations in the lot are expected to be somewhat greater compared with the virgin material.

Accordingly, in order to expect a recycled plastic material to have performance comparable with the virgin material thereof, it is necessary to more severely control the physical property values thereof, and it is preferable to control both variations of the Izod impact value and MFR within ±20%.

As described above, since the Izod impact value becomes small, and the MFR becomes great when the material is deteriorated, the physical property values of the recycled ABS resin are desirably controlled within −20% for the Izod impact value and +20% for the MFR compared with the virgin material thereof.

The deterioration of a resin has an influence on the Izod impact value and MFR thereof in particular. Accordingly, the quality of the recycled ABS resin can be maintained almost equally to the virgin material by controlling variations of the Izod impact value and MFR within the above respective ranges.

In the present invention, it is preferable that a color difference (also referred to as $\Delta Eab^*$) between the recycled ABS resin and the virgin material be smaller than 1.0.

$\Delta Eab^*$ is prescribed in the following manner in JIS K 7105. $\Delta Eab^* = \{(\Delta L^*)^2 + (\Delta a^*)^2 + (\Delta b^*)^2\}^{1/2}$. Incidentally, $\Delta Eab^*$ indicates a color difference between two color stimulus values, which is defined by a difference, $\Delta L^*$, $\Delta a^*$, $\Delta b^*$ in a coordinate, $L^*$, $a^*$, $b^*$ in the $L^*a^*b^*$ color space determined by CIE (International Commission on Illumination) in 1976.

In the case of an ABS resin, variation of tint that affects $\Delta b^*$ in particular is great, and so $\Delta b^*$ is preferably smaller than 1.0.

In the case of the ABS resin, complementary colors are generally allowed by the same process as in the virgin material when $\Delta Eab^*$ or $\Delta b^*$ is controlled, so that a part of the same color tone as in a part formed of the virgin material can be produced using the recycled ABS resin.

In the present invention, it is preferable that neither a flame retardant nor a reinforcing material be filled into parts which become raw materials of the recycled ABS resin.

The type and amount of a flame retardant to be added are determined according to the flame-retardant level required and a main resin material used, and UL 94 (Underwriter Laboratory) is generally known as a standard for flame retardance.

When a flame retardant is already contained in a resin to which a desired flame retardant is to be added, it is necessary to formulate the type and amount of the flame retardant to be added at every production, and so productivity may be lowered in some cases. When the type of the flame retardant to be added is different from that of the flame retardant already contained in the recycled ABS resin, the desired flame retardant may not be added according to the type of the flame retardant.

For the same reason, it is preferable that fillers such as glass and carbon; and reinforcing materials such as talc be not filled into parts which become raw materials of the recycled ABS resin. The reinforcing material is broken or cut in a grinding step when recycling, and the size and shape of the reinforcing material are not always constant, so that the specification of a virgin material may not be satisfied in some cases at the stage of the recycled material.

In addition, it is also preferable that other fillers than the flame retardants and reinforcing materials, for example, functional additives such as lubricants and antistatic agents be not filled into parts which become raw materials of the recycled ABS resin. The reason for it is that when fillers unnecessary for the recycled ABS resin are filled in the parts which become the raw materials of the recycled resin, it is difficult to remove them, and the uses of the recycled ABS resin may be limited in some cases according to the type of the fillers.

When a recycled ABS alloy resin is produced in particular, parts which become raw materials of the recycled ABS resin preferably contain no filler. Alloying is a method for blending at least two resins with each other to offset the defects of the respective resins blended and cause their merits to effectively act on each other. It is hence necessary to blend the resins so as not to trouble material functions required in the form finally blended. When additives are added to the resins before their blending, particularly, recycled materials are used as raw materials, however, there is a high possibility that filling ratio between fillers may vary at every lot at the stage of simple resins, so that material control to required functions such as maintenance of evenness and retention of function may become complicated in alloying in some cases.

From the above points in view, a part which becomes a raw material of the recycled ABS resin does not contain other additives than additives necessary to the minimum such as a coloring material. In this case, the virgin material also does not contain other additives than additives necessary to the minimum.

The process for recycling parts into the recycled ABS resin according to the present invention is a combination of steps heretofore used, such as grinding, washing, drying and foreign matter removal. Conditions of the respective steps are carefully optimized in order to produce a recycled ABS resin having the desired properties with good productivity.

The grinding step is preferably conducted while conducting screening using a screen having a mesh of 4 to 10 mm. More specifically, when parts composed mainly of an ABS resin are ground, it is preferable that the parts be ground by means of a high speed rotating grinder using a screen having a mesh within a range of from 4 mm to 10 mm, and fine plastic powder, metal powder, dust, etc. having a diameter of at most 2 mm be removed by means of a vibrating sieve.

When the mesh of the screen when grinding is at least 4 mm, the content of fine powder can be reduced, so that loss in the washing and drying steps can be reduced to enhance recycling efficiency. When the mesh is at most 10 mm, the ground product can be prevented from becoming too great, so that occurrence of clogging or the like in subsequent treatments can be prevented to improve operability.

The ground product is washed as needed. In the washing step, washing is preferably conducted with water in a proportion of at least 10 parts by mass per 1 part by mass of the ground product. When the proportion of a washing fluid is at least 10 parts by mass, a probability that ground products to be washed overlap each other is lowered, so that washing efficiency can be improved. Water is preferred as the washing fluid because of its cheapness.

The ground product after the washing is preferably dried to a water content of at most 0.3% by mass by means of a centrifugal dehydration system. When the water content is at most 0.3% by mass, a possibility that the ground product which has become flaky may be stuck on each other becomes low, and so operability can be improved. In addition, deterioration of the ABS resin by hydrolysis can be prevented. Further, the washing time is shortened compared with a filtration process using a filter or the like, and deterioration of color tone of the finally obtained recycled ABS resin can also be prevented.

In some cases, low-density products having a bulk density lower by at least 0.5 than the bulk density of the recycled ABS resin may be removed by air classification in order to remove foreign matter.

In some cases, high-density products having a true density higher by at least 0.5 than the true density of the recycled ABS resin may be removed by gravity separation.

The bulk density means a density including voids communicating with air and voids closed in the interior in a polycrystal, powder layer or molded products, while the true density is a density of a solid itself including no voids.

Parts made of an ABS resin as objects will be described taking, for example, parts for ink-jet printer as an example. When air classification is conducted before the washing step, it may be hard in some cases to cause a difference in bulk density by the influence of inks adhered, or it may be hard in some cases to cause a difference in bulk density even before the drying step. In order to easily cause a difference in bulk density to enhance removal efficiency, the air classification is preferably conducted after the grinding, washing and drying steps. Paper dust and the like which cannot be removed in the washing step are separated and removed by this air classification. When a difference in bulk density is at least 0.5, precision separation can be realized, and sufficient recycling efficiency can be ensured.

Ceramics, metal oxides and the like higher in true density than the recycled ABS resin are gravity-separated by precipitation in a washing fluid such as water. When a difference in true density is at least 0.5, separation efficiency is enhanced, and sufficient recycling efficiency can be ensured.

In some cases, metals may be removed by means of a magnet having a residual magnetic flux density of at least 1 tesla in order to remove foreign matter. The magnetic separation is suitable for ferromagnetic metals. When the magnet having a residual magnetic flux density of at least 1 tesla is used, a sufficient rate of capture to ferromagnetic materials can be ensured.

In some cases, metals may be removed by means of a metal detecting and removing device. Metal separation utilizing eddy current is preferably used for other metals than the ferromagnetic materials, which cannot be separated by magnetic force.

The present invention will hereinafter be described in more detail by reference to drawings taking an ink-jet printer as an example of the electric and electronic equipment. Incidentally, the present invention is not limited to the following description and can also be applied to other techniques.

Figure 2:
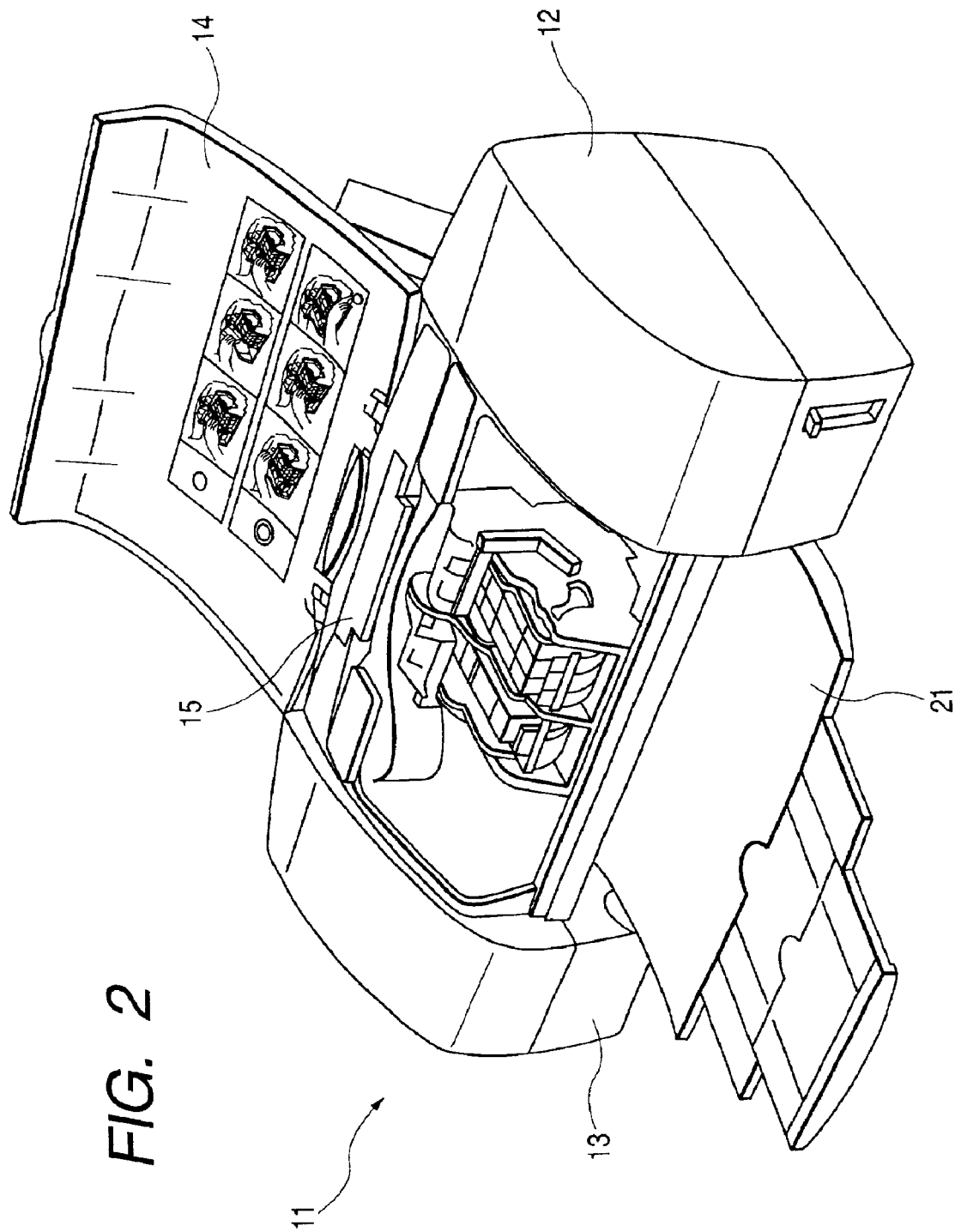
FIG. 2 is a typical perspective view illustrating the exemplary electric and electronic equipment in the present invention.

FIG. 1 illustrates an appearance of an ink-jet printer. The ink-jet printer 11 in this embodiment is equipped with an operating cover 14 capable of opening and closing between an upper case 12 and a lower case 13. As illustrated in FIG. 2, the ink-jet printer can be held in such a state that the operating cover 14 has been opened. A label 15 indicating the order of arrangement of ink tanks for an ink-jet recording head installed and used in this ink-jet printer 11 is attached on the upper case 12. Recording paper printed by the ink-jet recording head is discharged on a tray 21. In this embodiment, the upper case 12 of the ink-jet printer is used as a part which is a raw material of a recycled ABS resin.

Figure 4:
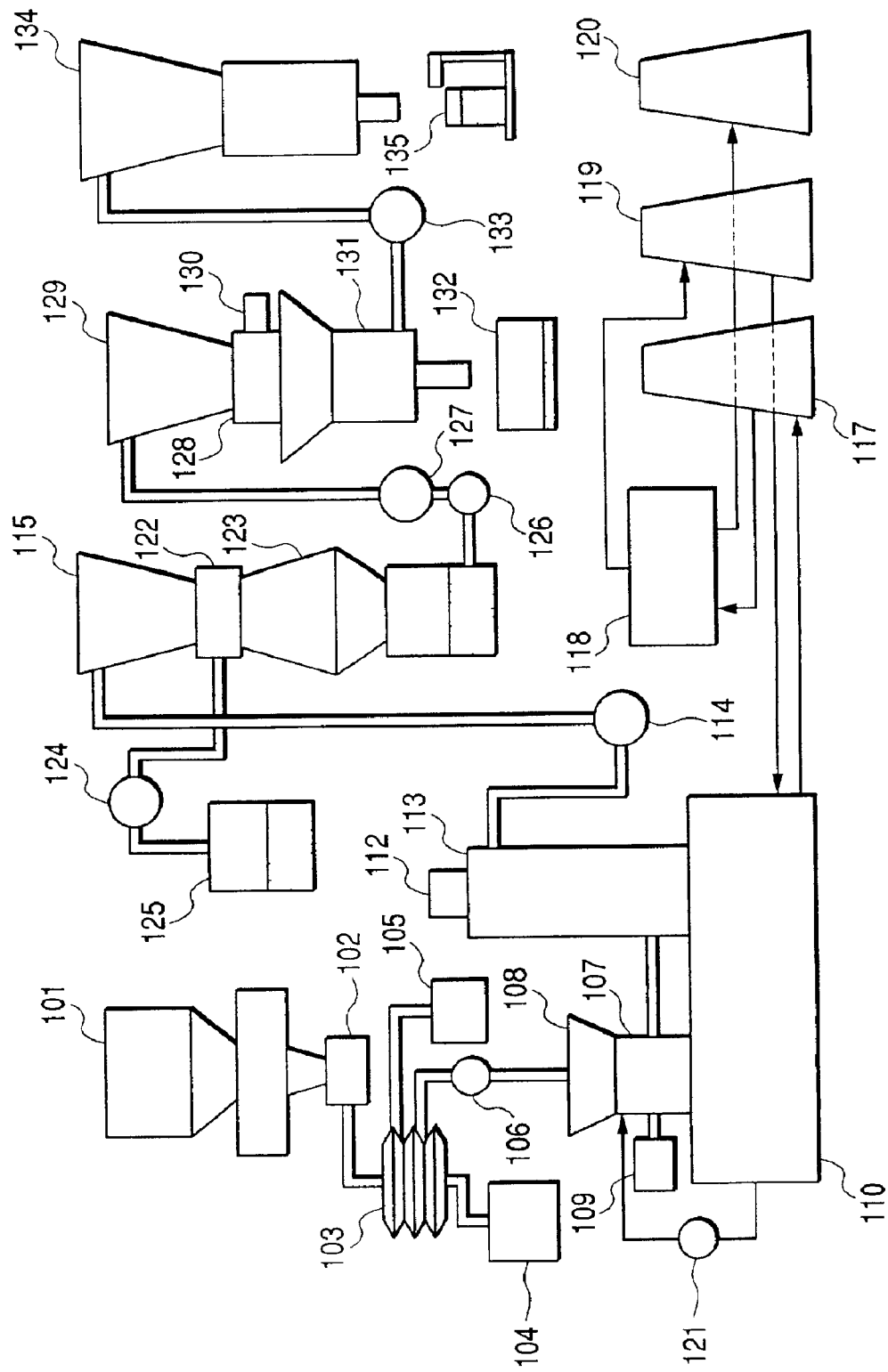
FIG. 4 typically illustrates an exemplary recycling apparatus for ABS resin in the present invention.

A rough constitution of a recycling system in this embodiment is illustrated in FIG. 4. More specifically, the part which is a raw material of a recycled ABS resin is ground to the predetermined size by a grinder 101. The ground material is sent in each predetermined amount to a vibrating sieve 103 by a conveying device 102 to discharge fine powder, which troubles subsequent operations due to clogging or the like, into a waste tank 104 and moreover to collect the raw material not sufficiently ground into a collecting tank 105. This collected material is returned again to the grinder 101.

The raw material ground to the predetermined size is passed through a magnetic separator 106 to capture ferromagnetic metals contained in the ground material. Thereafter, it is fed to a hopper 108 of a screw feeder 107. The screw feeder 107 is driven by a motor 109 to feed the ground material in each predetermined amount into a washing tank 110.

Figure 5:
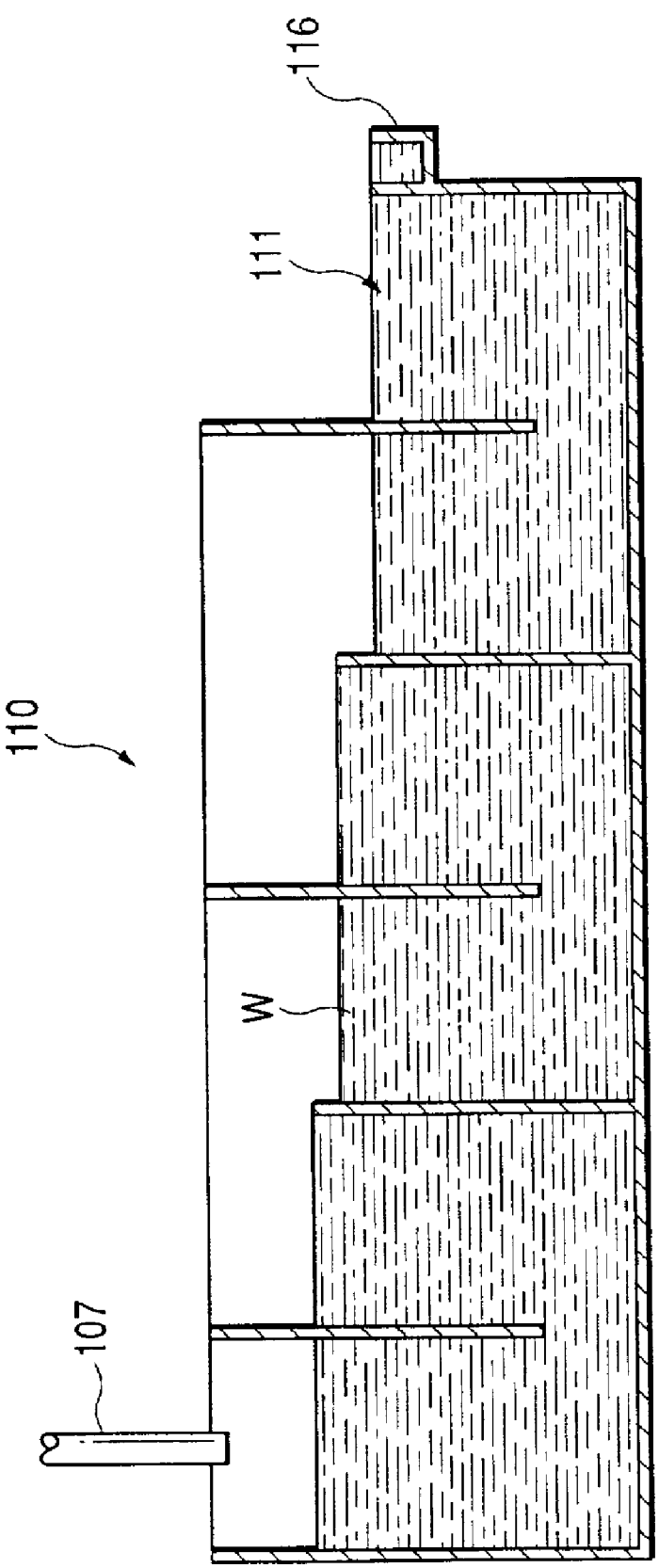
FIG. 5 typically illustrates an exemplary cleaning tank equipped in the recycling apparatus for ABS resin in the present invention.

A rough constitution of the washing tank 110 in this embodiment is illustrated in FIG. 5. More specifically, the washing tank 110 in this embodiment is partitioned into a plurality of chambers to separate the ABS resin from metals and other foreign matter utilizing a difference in specific gravity. The ground material flowed out in a final chamber 111 is dried by a washing and dehydrating device 113 driven by a motor 112 and fed to a cyclone 115 by an air blower 114.

A washing fluid W overflowed from an overflow weir 116 of the washing tank 110 is sent from a buffer tank 117 to a distilling and concentrating device 118. The washing fluid is cleaned by the distilling and concentrating device 118, fed to a condensed liquid tank 119 and returned again to the washing tank 110. A residue concentrated by the distilling and concentrating device 118 and colored by inks or the like is discharged into a concentrate tank 120.

A part of the washing Huid W overflowed from the overflow weir 116 is used as a lubricant when transferring the ground material in the screw feeder 107.

The ground material fed to the cyclone 115 is air classified therein and poured on the side of an aspirator 123 by a rotary valve 122, and paper, foamed polyurethane resin and the like smaller in bulk specific gravity than the ground material are discharged into a collecting tank 125 by a blower 124.

The ground material to which metal powder or the like is attached and which flows down from the aspirator 123 is again passed through a magnetic separator 126 to capture and separate ferromagnetic metal powder attached to the surface thereof, and fed to a stock tank 129 of a screw feeder 128 by an air blower 127. The ground material is sent in each predetermined amount by the screw feeder 128 driven by a motor 130 to a metal separator 131 for separating metals from the ground material utilizing eddy current or the like. Metal powder and the like contained in the ground material are separated by this metal separator 131, and the metal powder is discharged into a collecting tank 132.

The ground material separated by the metal separator 131 is charged into a hopper 134 by a blower 133 and collected as a final recycled ABS resin into a collecting tank 135.

The recycled ABS resin thus obtained is extremely high in quality and bears comparison with or scarcely suffers by comparison with a virgin material. Such a recycled ABS resin is blended with a thermoplastic resin such as a PC resin, PVC resin and/or PBT resin, the blend is melt-mixed, and the melt mixture is pelletized, whereby pellets of a high-quality recycled ABS alloy resin can be obtained.

The production of an alloy resin is generally conducted by blending two or more resins with each other and melt-mixing the blend. In order to maintain or improve the quality of the alloy resin, the quality of the respective resins used in the production of the alloy is important for the quality of the resin constituting the alloy. Therefore, some standard is generally provided on the quality of the respective resins. When a recycled resin is used as a raw material of an alloy resin, it is difficult to make the resulting alloy resin high quality if the quality of the recycled resin is poor. Accordingly, how to bring the quality of the recycled resin close to the quality of the virgin material is important. According to the production process of the recycled ABS resin described above, however, a recycled ABS resin having sufficient quality to produce an alloy resin can be provided.

For example, the recycled ABS alloy resin can be produced in accordance with a process which comprises the steps of blending the recycled ABS resin with at least one resin selected from the group consisting of PC, PVC and PBT; melt-mixing the blend; and pelletizing the melt mixture. Apparatus used in the respective steps and their process conditions are carefully optimized in order to obtain a recycled ABS alloy resin having the desired properties.

For example, the step of melt-mixing is conducted by a Banbury mixer, extruder or the like, for example, at a temperature of from 220° C. to 250° C. for 90 seconds or more.

Taking a case of a recycled ABS alloy resin containing PC as an example, 10 to 70 parts by mass of the recycled ABS resin are blended with 90 to 30 parts by mass of the PC resin, whereby an alloy resin having excellent plasticity can be obtained.

As already described above, the production processes of the ABS resin include mainly an emulsion polymerization process and a bulk suspension polymerization process. With respect to the alloy with the PC resin, the use of the ABS resin produced by the emulsion polymerization process generally tends to provide an ABS alloy resin excellent in flowability. On the other hand, the use of the ABS resin produced by the bulk suspension polymerization process tends to provide an ABS alloy resin excellent in impact resistance. However, when 50 to 70 parts by mass of the recycled ABS resin and 50 to 30 parts by mass of the PC resin are blended to make an alloy resin, a recycled ABS alloy resin having sufficient flowability and impact resistance can be provided irrespective of the production process of the ABS resin.

From the viewpoint of balance between flowability and impact resistance, a PC resin having an average molecular weight of, for example, from 20,000 to 40,000 is used.

Incidentally, even when a recycled ABS alloy resin is produced from any other resin than the PC resin and the recycled ABS resin, optimum ranges are present on the blending mass ratio and average molecular weight like the case of the PC resin.

The present invention will hereinafter be described specifically by the following examples. However, the present invention is not limited to these examples.

Figure 3:
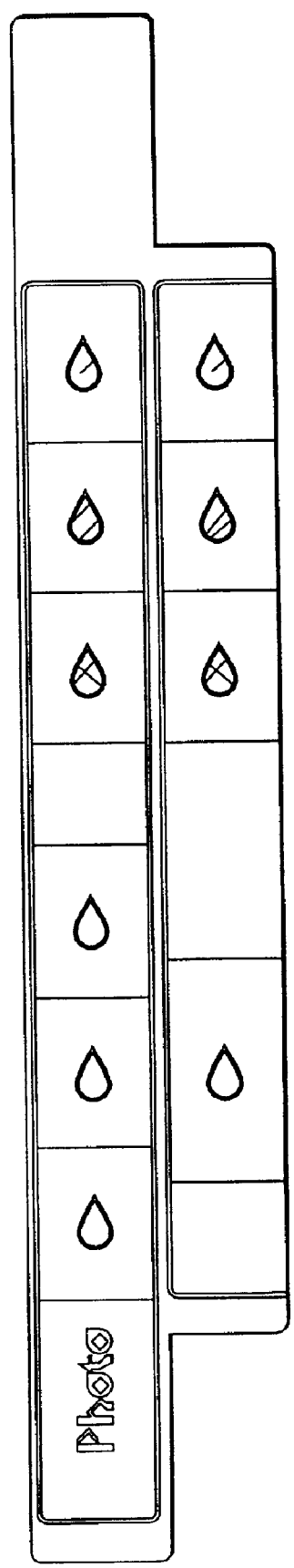
FIG. 3 is a plan view illustrating an exemplary label attached on the electric and electronic equipment in the present invention.

7.8 kg of an upper case 12 (material: ABS resin; average thickness: 2.0 mm; true specific gravity: 1.05) of an ink-jet printer (BJF600, trade name, manufactured by Canon Inc.) as illustrated in FIG. 1, injection-molded part of a virgin ABS resin, was provided as a raw material for a recycled ABS resin. A label indicating the order of arrangement of ink tanks for an ink-jet recording head installed and used in this ink-jet printer as illustrated in FIG. 3 was attached on the upper case 12. None of fillers and reinforcing materials for imparting properties such as strength, lubricity and flame retardance were contained in the upper case 12.

The label described above is compatible with ABS resin, comprises Seventack #5990 (trade name; product of Kuramoto Sangyo K.K.; material: ABS film; thickness: 145 $\mu$m) as a base material and Seventack #5993 (trade name; product of Kuramoto Sangyo K.K.; material: ABS laminate; thickness: 55 $\mu$m) as a coating material and details of which are described in Japanese Patent Application Laid-Open No. 8-67857.

Inks used in printing on the label are those weak in resin attack designated by label makers in view of damage to the ABS resin. The printing is 9-color printing (four colors in a gray shade, one color in a yellow shade, two colors in a cyan shade and two colors in a magenta shade) by offset printing, the inks are applied to the whole surface area of the label including the printing of a ground color on the base material. Since the mass of an upper case 12 is 389 g and the mass of the attached label is 2 g, the mixed rate of the label is 0.51% by mass.

(Recycling of ABS Resin)

The upper case 12 was ground by means of a grinder 101 (JC-10, trade name; manufactured by Morita Seiki K.K.) equipped with a screen having a mesh of 6 mm.

The resultant ground material was washed by means of a cleaning and washing-fluid-removing device (Hichip Cleaner CFP-500, trade name; manufactured by Toyo Seiki K.K.; corresponding to 110, 113 in FIG. 4), and the washing fluid was removed.

At the same time, the ground material was classified into foreign matter having a heavy bulk specific gravity, the difference in true density of which was at least 0.5, and another ground material. The charging rate of the ground material at that time was 2.5 kg/min, and the flow rate of the washing fluid W (using tap water) was 80 liters/min. The washing fluid W was received in a washing tank 110 having a volume of 2,000 liters as illustrated in FIG. 5 and filtered by a filter with nylon monofilament (Bag Filter R100NMO12M, trade name, manufactured by Loeffler Co.; filtration precision: 100 μm) received in a filter housing (EBF112S6M, trade name, manufactured by Loeffler Co.) in order to recycle and reuse it by means of a pump (not illustrated).

The water content of the ground material washed and subjected to washing fluid removal was 0.11% by mass.

Thereafter, the ground material was conveyed to an air classifying aspirator system (KF-12, trade name; manufactured by Horai K.K.; corresponding to 123 in FIG. 4) by an air blower 114 (DF-5, trade name; manufactured by Horai K.K.) to classify it into foreign matter having a light bulk specific gravity, the difference in bulk density of which was at most 0.5, and another ground material.

The ground material passed through the air classifying aspirator system was charged into a magnetic separator 126 (Magic Catch, trade name; manufactured by JMI K.K.; residual magnetic flux density: 1.3 teslas) to remove ferromagnetic components contained in the ground material.

The ground material was then conveyed to a stock tank 129 by an air blower 127 (DF-1, trade name; manufactured by Horai K.K.). The ground material was quantitatively conveyed in a proportion of about 3 kg/min from this stock tank 129 to an eddy current type metal detecting and removing device (MDS-30A, trade name; manufactured by Sensor Technology K.K.; corresponding to 131 in FIG. 4) to remove and classify metals.

(Evaluation of Properties)

The recycled ABS resin obtained above and a virgin material for the upper case 12 were pelletized, and these pellets were used to prepare each 5 specimens (in accordance with ASTM D 256; ¼-inch notched) for Izod impact test, thereby measuring Izod impact strength.

The step of pelletizing was conducted by installing a 60-mesh filter in an extruder (DMG40, trade name; manufactured by Nippon Purakon K.K.), and melting, mixing and extruding each resin. The specimens for Izod impact test were prepared by setting a family mold for ASTM specimen in an injection molding machine (IS-80G, trade name; manufactured by Toshiba Machine Co., Ltd.) and injection-molding the resin at a cylinder temperature of 200° C.

The specimens for Izod impact test were used to measure a color difference (in accordance with JIS Z 8722, Condition D) of the recycled ABS resin based on the virgin material.

MFR was measured five times at 220° C. under a load of 98.07 N in accordance with JIS K 7210, Method B to average the resultant values. This method is a method for measuring a extrusion rate when a molten thermoplastic is extruded through a die (metal block having a nozzle for shaping) having a predetermined length and diameter under conditions of predetermined temperature and pressure, and Method B is an automatic time measuring method applied to materials whose MFR is 0.50 to 300 g/10 min.

A full automatic melt indexer type 270 manufactured by Technoseven Co. was used as a testing machine, and the die (resin extruding part) had a length of 8.0137±0.025 mm and an inner diameter of 2.092±0.002 mm.

A dry recycled ABS resin or virgin material was charged in an amount of 7 g at every measurement under conditions of 80° C. for 2 hours. After the resin sample was preheated at 220° C. for 6 minutes, the sample was extruded at a testing temperature of 220° C. under a testing load of 98.07 N (10 kgf). At this time, the time (t sec) required for a piston to move for a distance of 25.0 mm (regarding as L) was measured to calculating out MFR in accordance with the following equation:

$$MFR = 42.6 \times L \times \rho / t.$$

Incidentally, the melt density ρ of the resin at the testing temperature was 0.953 g/cm$^3$. Therefore, MFR=42.6×25.0× 0.953/t.

Rockwell hardness was also measured as an index for resistance to scuffing in accordance with ASTM D 785.

The measured results are shown in Table 1. As apparent from Table 1, the Izod impact value undergoes no change, and MFR decreases only by 2.1%. In order to impart performance comparable with a virgin material to a recycled plastic material, it is necessary that changes of Izod impact value and MFR are within 0.8 times and 1.2 times, respectively. The rates of change in the physical property values shown in Table 1 satisfy these standards. It was thus confirmed that the properties of the recycled ABS resin as a plastic material are sufficient.

The Rockwell hardness was also almost equal to that of the virgin material, and it was hence confirmed that the resistance to scuffing of the recycled ABS resin is sufficient, and the recycled ABS resin is suitable for use in the production of parts of electric and electronic equipments.

Further, ΔEab* was 0.20, and Δb* was 0.01, and thus both values are sufficiently smaller than 1.0. It was hence confirmed that the hue is scarcely changed compared with the virgin material.

TABLE 1

| Test item | | Test standard | Unit | Virgin material | Recycled ABS resin |
|---|---|---|---|---|---|
| Mixed rate of Compatible label | | — | % by mass | 0 | 0.51 |
| Izod impact strength | | According to ASTM D 256 | J/m | 147 | 147 |
| Rockwell hardness | | According to ASTM D 785 | — | 108 | 109 |
| Melt flow rate | | According to JIS K 7210 | g/10 min | 47 | 48 |
| Color difference | ΔEab* | According to JIS Z 8722 | — | Standard | 0.20 |
| | ΔL* | | | | -0.16 |
| | Δa* | | | | -0.10 |
| | Δb* | | | | 0.01 |

(Production of Parts Using Recycled ABS Resins)

In the ink-jet printer 11 (BJF600, trade name, manufactured by Canon Inc.) as illustrated in FIGS. 1 and 2, all plastic parts are produced by virgin materials at present and sold.

In this embodiment, the recycled ABS resin obtained above was used to produce an upper case 12 (average thickness: 2 mm; weight: 389 g), a lower case 13 (average thickness: 2 mm; weight: 545 g) and an operating cover 14 (average thickness: 2.3 mm; weight: 159 g) by injection molding under the same conditions as in the virgin material.

The thus obtained three parts had properties, appearance and color (hue, saturation and lightness) comparable with those of parts produced with the virgin material, and any difference was not visually observed.

Since the recycled ABS resin was produced above using, as a raw material, the upper case 12 of 389 g, on which the label of 2 g composed mainly of an ABS resin had been attached, the mixed rate of the label in the resultant recycled ABS resin was 0.51% by mass as already described. However, when a recycled ABS resin is generally produced, parts, on which no label has been stuck, are also used as a raw material. Therefore, the mixed rate of the label is lowered. For example, the recycling of all armor parts of the ink-jet printer 11, including the upper case 12, is superior in productivity to the case where only the upper case 12 is recycled by a separate step, since the number of steps is decreased. Accordingly, all the armor parts are generally used as raw materials. At this time, the total mass of the armor parts are 1093 g, and the label of 2 g is attached on the upper case 12 alone, and so the mixed rate of the label in the resulting recycled ABS resin is reduced to 0.183% by mass from 0.51% by mass. Accordingly, when all the armor parts are used as raw materials to provide a recycled ABS resin, the physical property values of the resulting recycled ABS resin can be expected to be closer to those of the virgin material than the physical property values shown in Table 1. It is thus considered that such a recycled ABS resin can be handled more equally to the virgin material.

Each of the recycled ABS resins obtained above can be used to produce recycled ABS alloy resins composed of PC and the ABS resin, PVC and the ABS resin, PBT and the ABS resin, or any other combination of the ABS resin. Since the recycled ABS resin according to the present invention has properties comparable with the virgin ABS resin, a recycled ABS alloy resin can be produced by the same process as the case where the virgin ABS resin is used. The physical properties of the resulting recycled ABS alloy resin are comparable with those of the virgin ABS alloy resin.

According to the present invention, an ABS resin having good properties can be reproduced using ABS resin-based parts as raw materials, and moreover a recycled ABS alloy resin can be produced. Accordingly, the uses of the recycled ABS resin can be widened, and the recycling of plastic materials can thus be promoted.

What is claimed is:

1. A process for producing a recycled ABS alloy resin, which comprises the steps of:

(i) blending a recycled ABS resin with at least one resin selected from the group consisting of PC, PVC and PBT;

(ii) melt-mixing the blend resulting from the step (i); and (iii) pelletizing the melt mixture resulting from the step (ii)

wherein the recycled ABS resin used in the step (i) is obtained through the steps of:

(1) grinding an ABS resin molded product and screening the ground resin by a screen having a mesh of 4 to 10 mm to obtain a ground product;

(2) washing the ground product resulting from the step (1) with water in a proportion of at least 10 parts by mass per 1 part by mass of the ground product;

(3) drying the water-washed ground product resulting from the step (2) to a water content of at most 0.3% by mass; and, after the step (3), step (4), (6) or (7);

(4) removing low-density products having a bulk density lower by at least 0.5 than the bulk density of the recycled ABS resin by air classification;

(6) removing metals by means of a magnet having a residual magnetic flux density of at least 1 tesla; or (7) removing metals by means of a metal detecting and removing device.

2. The process according to claim 1, wherein the step (4) is conducted.

3. The process according to claim 1, which further comprises the step of removing high-density product having a true density higher by at least 0.5 than the true density of the recycled ABS resin by gravity separation as a step (5).

4. The process according to claim 3, wherein the step (5) is conducted at the same time as the step (2).

5. The process according to claim 1, wherein the step (6) is conducted.

6. The process according to claim 1, wherein the step (7) is conducted.

7. The process according to claim 1, wherein the Izod impact strength of the recycled ABS resin is at least 0.8 times as much as the Izod impact strength of the virgin ABS resin.

8. The process according to claim 1, wherein the melt flow rate of the recycled ABS resin is at most 1.2 times as much as the melt flow rate of the virgin ABS resin.

9. The process according to claim 1, wherein a color difference ($\Delta Eab^*$) between the recycled ABS resin and the virgin ABS resin is smaller than 1.0.

* * * * *

UNITED STATES PATENT AND TRADEMARK OFFICE
CERTIFICATE OF CORRECTION

PATENT NO. : 6,881,368 B2
DATED : April 19, 2005
INVENTOR(S) : Yasushi Koike

It is certified that error appears in the above-identified patent and that said Letters Patent is hereby corrected as shown below:

Column 1,
Line 35, "very" should be deleted;
Line 44, "if used" should be deleted; and
Line 50, "more" should read -- further --.

Column 2,
Line 33, "more" should read -- further --; and
Line 61, "molduability" should read -- moldability --.

Column 3,
Line 60, "when the" should read -- when --.

Column 4,
Line 64, "carbon;" should read -- carbon --.

Column 7,
Line 30, "Huid" should read -- fluid --.

Column 10,
Line 4, "measuring a" should read -- measuring an --.

Column 12,
Line 6, "(ii)" should read -- (ii), --; and
Line 19, "(7);" should read -- (7): --.

Signed and Sealed this

Thirtieth Day of August, 2005

JON W. DUDAS
*Director of the United States Patent and Trademark Office*